United States Patent [19]

Fischer et al.

[11] Patent Number: 4,759,964
[45] Date of Patent: Jul. 26, 1988

[54] STRUCTURAL PANEL

[75] Inventors: Josef Fischer, Ried im Innkreis; Walter A. Stephan, Braunau, both of Austria

[73] Assignee: Fischer Gesellschaft m.b.H., Reid im Innkreis, Austria

[21] Appl. No.: 905,302

[22] Filed: Sep. 9, 1986

[51] Int. Cl.$^4$ .............. B32B 3/12; B32B 3/00
[52] U.S. Cl. .................. 428/116; 428/209; 428/326; 428/920; 428/921
[58] Field of Search ............ 428/116, 209, 326, 920, 428/921

[56] References Cited

U.S. PATENT DOCUMENTS

| 1,366,147 | 1/1921 | Worthington | 428/116 |
| 2,839,442 | 6/1958 | Whitaker | 428/116 X |
| 3,518,156 | 6/1970 | Windecker | 428/326 X |
| 4,020,225 | 4/1977 | Fujiwara et al. | 428/921 X |

FOREIGN PATENT DOCUMENTS

| 159722 | 10/1940 | Austria | 428/116 |
| 489787 | 6/1954 | Italy | 428/116 |
| 193983 | 6/1937 | Switzerland | 428/116 |
| 157432 | 2/1922 | United Kingdom | 428/116 |
| 2133342 | 7/1984 | United Kingdom | 428/177 |

Primary Examiner—John E. Kittle
Assistant Examiner—Patrick J. Ryan
Attorney, Agent, or Firm—Fleit, Jacobson, Cohn & Price

[57] ABSTRACT

A structural panel in the form of a sandwich construction, comprises a core and at least one cover layer on at least one external surface of the core. Said cover layer itself has on its external surface at least a first layer of fibrous material and has on its internal surface at least a second layer having a high melting point and a high combustion temperature and also being gas-tight, thereby preventing hot gases from passing through the layer and then burning the layer disposed therebelow.

9 Claims, 1 Drawing Sheet

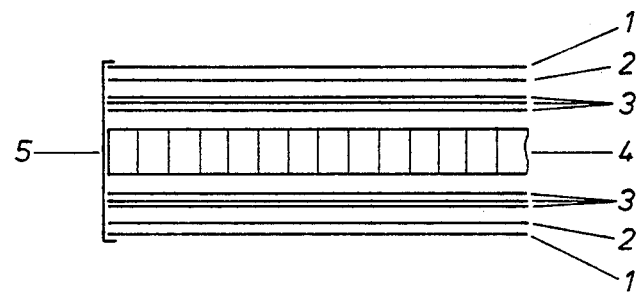

STRUCTURAL PANEL

FIELD OF INVENTION

The invention relates to a structrual panel in the form of a sandwich construction, comprising a core and at least one upper and/or lower cover layer together with a layer of fibrous material and a layer having a high melting point and a high combustion temperature. The structural panel is especially intended for floors, in particular floors in aeroplanes.

BACKGROUND OF THE INVENTION AND PRIOR ART DISCUSSION

Sandwich panels serving as floor panels for vehicles, especially those of a light construction for aeroplanes, are known per se. Balsa crosscut wood or hexagonal Nomex honeycombs are used as cores therefor. Both aluminium panels with a weight per unit area of 5 kg/m$^2$ and fibre-reinforced plastics materials based on epoxy resin are known as cover or belt materials, as well, more recently, as phenol resins. The fibres—carbon, Kevlar or glass fibres—are inserted as several plies of unidirectional layers or bi-directional fabrics. Carbon fibre reinforced sandwich panels of known prior art weigh at least 2 kg/m$^2$. The lightweight panels are mainly intended for use in aeroplanes in order to keep as low as possible the operating deadweight and, as a consequence thereof, the fuel costs. In the aeroplane industry, there are exact requirements for minimizing combustibility and for minimizing the density of smoke and the toxicity of materials. The values are measured and evaluated according to current standards. Epoxy resins do not meet these requirements. Modifications using chemicals permit the requirement regarding combustibility to be met, but the density of the smokes and the toxicity are also increased to an unacceptable level. Phenol resins, which have been used more recently since they meet the requirements regarding combustibility and also give off relatively few smoke, are inadequate, due to their mechanical properties, for forming the adhesive joint between the cover layer or core material, with the result that epoxy resin is inserted into this adhesive joint. With comparable combustibility, this panel figuration produces approximately half to one quarter of the smoke levels of a conventional, lightweight panel.

A fire-resistant wall has been disclosed in U.S. Pat. No. 3,518,156, wherein one outer layer is formed from a thermoset resin and the other outer layer is formed from metal. a fibre-reinforced layer is embedded in the wall on each side of the core. In the event of fire, the metallic layer cannot withstand a temperature of between 700° C. and 800° C.

SUMMARY OF INVENTION

The invention seeks to reduce the above-mentioned combustibility, the smoke density and toxicity of the smokes of a composite structure comprising various materials compared with known structures.

This object is achieved according to the invention in that, with a structural panel of the above-mentioned type, a layer of fibres or fibre-reinforced materials is disposed on the layer of material which has a high melting point and a high combustion temperature. This measure makes it impossible for the layer having a high melting point and a high combustion temperature to melt if flames occur at a temperature which is higher than the melting point of said layer, since a gas-insulating layer is formed as a result of the layer of fibres or fibre-reinforced material being burned-off, and such layer serves as insulation against the influence of heat for the layer disposed therebelow.

Consequently, in the event of fire, the layer having a high melting point and a high combustion temperature can even withstand a temperature of between 700° C. and 800° C. and higher temperatures, even if the melting point of this layer is below that temperature, since this layer is subjected to a substantially lower temperature loading due to the insulation.

A foil of aluminium is advantageously used for the layer having a high melting point and a high combustion temperature, the thickness of such foil being preferably less than 0.1 mm, and being preferably between 0.02 mm and 0.05 mm. However, any other foil or film with a melting point higher than 400° C. may also be used. It is conceivable, therefore, to use plastics material films or foils of desirable metals, e.g. copper or steel.

In order to keep the weight of the structural panel very low and in order to keep the loadability thereof high, it is advantageous to make the structure of the core cellular, preferably honeycombed, the walls of the cavities between the cells or honeycombs extending perpendicular, or substantially perpendicular, to the cover layer or cover layers. A core in accordance with U.S. patent application Ser. No. 553,401 has proved to be particularly advantageous, wherein corrugated foils, preferably formed from impregnated, paper-like material, e.g. Aramid fibrous paper, are laminated, a respective bottom ply—which is advantageously flat and is preferably formed from the same material—being disposed between every two layers and having adhered thereto the wave crests and/or wave troughs of the adjacent, corrugated foils or foil.

The structural panel of the invention is particularly advantageous because the passenger area is protected from the effect of fumes and heat for a pre-determined period of time, thereby permitting the passengers to leave the aeroplane within the emergency period. The measures according to the invention permit this period to be longer than the values hitherto.

When the structural panel is used as a floor panel, fewer smokes are produced in the event of a fire, because only the upper layer of the floor panel burns.

BRIEF DESCRIPTION OF THE DRAWING

Further details of the invention are explained more fully with reference to the drawing which is a cross-sectional view through an embodiment of a structural panel according to the invention, the individual layers being shown with spacings therebetween for greater clarity.

DESCRIPTION OF PREFERRED EMBODIMENT

Only a fraction of the structural panel selected as an embodiment is shown. It comprises a core 4 which, as already mentioned, preferably has a cellular structure and is covered on each side by a layer 3 of fibrous material. The layer may be formed from a plurality of plies—three plies in the present case—wherein the fibres of the piles may extend in the same direction or in different directions. It is possible, therefore, to use short or long fibres. In the latter case, the fibres may extend in one or more directions. In the latter case, the fibres may extend, for example, in two directions which are perpendicular to each other. The fibres may be formed as fabrics, or it is possible for rovings to be used.

On the outer surface, the structural panel is also provided with a layer 1 of fibrous material, but this layer is preferably thinner than layer 3 and is formed, for example, from only one single ply, preferably a fabric.

For the manufacture of the structural panel, the fibrous layers 1 and 3 are impregnated with resin which hardens with heat and joins the plies together.

At least the layer 1 of fibrous material, which is disposed on the outer surface, is impregnated with flame-retardant resin, e.g. a resin based on epoxy or phenol resin. Layer 1 is preferably impregnated with phenol resin and layer 3 is preferably impregnated with epoxy resin. However, any other suitable type of impregnation may also be used.

Layer 1 is preferably a surface laminate.

A layer 2, formed from a material with a high melting point and a high combustion temperature, preferably formed from metal, e.g. aluminium, is situated between the layers 1 and 3 of fibrous material and is preferably thinner than 0.1 mm. In particular, an aluminium foil with a thickness of between 0.02 mm and 0.05 mm may be used, so that its weight is not detrimental to the weight of the floor panel, or component part respectively. This layer 2 is preferably gas-tight; thus, hot gases are prevented from passing through the layer and then burning the layer situated therebelow. This layer preferably also has good thermal conductivity, like aluminium, and thereby dissipates the heat. A high combustion temperature is between 700° C. and 1000° C., and is preferably 800° C. The melting temperature of the material is generally below the combustion temperature.

The aluminium foil serves as an insulation layer for the resin-rich interior of the floor panel, or component part respectively. Experience has shown that flame temperatures of approximately 800° C. during the period of aeroplane evacuation produce accidents, according to the aeroplane concerned, and produce resultant fires; consequently, the tests are carried out according to American air travel standards within six minutes at these flame temperatures. The subject-matter of the invention withstands this test.

As a gas seal on the surface of the composite structure, the aluminium foil would normally not withstand the temperature ceiling and would melt. With the subject-matter of the invention, the flame temperature is reduced by the melting and wearing of the surface fibre laminate to such a considerable extent that the aluminium foil does not melt and serves as an actual seal against smokes. The resin-rich, structural fibrous layers are not affected by flames. However, it is also possible to use a different metallic or non-metallic material which is heat-resistant and non-combustible.

Because of the layer-impregnating materials such as, for example, phenol resin and epoxy resin, plastics material films, ceramic films, sheet steel foils and others could also be used instead of aluminium foils.

Because of the aluminium foil which also separates the two hardening processes of the adjacent fibrous layers, which processes exclude one another in different manners, the structural panel can be economically produced in the so-called "one-shot bonding" process. During the polycondensation of phenol resin, water is produced which would destroy the epoxy resin during the hardening reaction of polyaddition.

The structural panels according to the invention have fume values of between ¼ and 1/20 of the values of conventional panels. Because of the large area of adhesion and the low inherent rigidity of the aluminium foil, adhesion values between the foil and the fibrous plies or fabrics can easily be achieved which correspond to the properties between the cells of the lightweight structural core and the structural cover layer or belting, so that the properties of the composite structure are not adversely affected. Rather, properties such as the extremely high capacity of energy to destruction are visibly improved by the high degree of deformability of aluminium compared with fibrous materials of the composite structure.

The panels are produced in one working operation, and the panels may also be sealed laterally by a flame- and fume-resistant foil, e.g. a metallic foil and preferably aluminium foil 5, which joins the two cover layers via the edges.

It is also possible to provide more than two fibrous layers with a respective metallic layer, preferably an aluminium layer, interposed therebetween.

The fibres may be formed from any reinforcing material, e.g. glass fibres, impregnated carbon fibres, and the like. The structural panel may be installed between any desirable clamping devices.

We claim:

1. A structural panel in the form of a sandwich construction, comprising a core and at least one cover layer on the exterior of the core, wherein said cover layer has at least a first layer of fibrous material on its external surface and at least a second layer being thinner than 0.1 mm and being disposed between the first layer and the core, the second layer having a high melting point and a high combustion temperature, the first layer providing, in the event of a fire, a gas insulating layer and wherein the panel includes a third layer of fibers or fiber-reinforced material disposed between the cover layer and the core.

2. A structural panel as recited in claim 1, wherein said second layer is formed from metal.

3. A structural panel as recited in claim 2, wherein said second layer is formed from aluminum.

4. A structural panel as recited in claim 1, wherein said core has a cellular structure, the walls of the cells extending substantially perpendicular to the surface of the panel.

5. A structural panel as recited in claim 1, wherein said second layer is disposed directly below said first layer, and said first layer is a surface laminate.

6. A structural panel as recited in claim 1, wherein said first layer is impregnated with a flame-retardant resin.

7. A structural panel as recited in claim 6, wherein the resin is based on epoxy or phenol resin.

8. A structural panel as recited in claim 1, wherein said second layer is impermeable to gas.

9. A structural panel as recited in claim 8, wherein said first layer is joined to said second layer by phenol resin, and said second layer is joined to a layer situated therebelow by epoxy resin.

* * * * *